July 6, 1965 YASUO KOMAMIYA ETAL 3,193,699

MEMORY UNIT USING A NEGATIVE RESISTANCE ELEMENT

Filed Jan. 24, 1961 4 Sheets-Sheet 1

INVENTORS
Yasuo Komamiya
Takeji Sugiyama
BY
Ernest G. Montague
Attorney

Inventors:
Yasuo Komamiya
Takeji Fujiyama
By Ernest G. Montague
Attorney

MEMORY UNIT USING A NEGATIVE RESISTANCE ELEMENT

Filed Jan. 24, 1961

4 Sheets-Sheet 3

Inventors:
Yasuo Komamiya
Takeji Sugiyama
By Ernest G. Montague
Attorney

INVENTORS
Yasuo Komamiya
Takeji Sugiyama
BY
Ernest G. Montague
Attorney

United States Patent Office 3,193,699
Patented July 6, 1965

3,193,699

MEMORY UNIT USING A NEGATIVE RESISTANCE ELEMENT

Yasuo Komamiya, Kohoku-ku, Yokohama, and Takeji Sugiyama, Tokyo, Japan, assignors to Agency of Industrial Science and Technology, Tokyo, Japan, a corporation of Japan Filed Jan. 24, 1961, Ser. No. 84,661
Claims priority, application Japan, Jan. 28, 1960, 35/2,303; Mar. 7, 1960, 35/6,969; Sept. 10, 1960, 35/37,543
3 Claims. (Cl. 307—88.5)

The present invention relates to a memory unit using a negative resistance element.

The memory unit, in accordance with the present invention, has an advantage which is suitable for applying it to a very high speed and a very large capacity, and particularly upon its application to the reading, it obtains a stable and reliable reading and has a merit of non-destructing the content upon the reading. However, in such type of the memory unit, there remains always the drawback that two negative resistance elements are needed to one basic circuit and also two sets of the address designation circuits for writing and reading thereof.

It is, therefore, one object of the present invention to provide a memory unit using a negative resistance element which removes such defects from the memory unit.

It is another object of the present invention to provide a memory unit using a negative resistance element, wherein one basic circuit of the unit comprises one negative resistance element and also an address designation circuit is capable to make it by one set, and yet it retains all the above merits excepting the non-destructive point of the content. Further, the non-destructive point of the content can substantially be equalized thereto by the provision of a circuit to be described below.

With these and other objects in view, which will become apparent in the following detailed description, the present invention will be clearly understood in connection with the accompaying drawings, in which.

Figure 4:
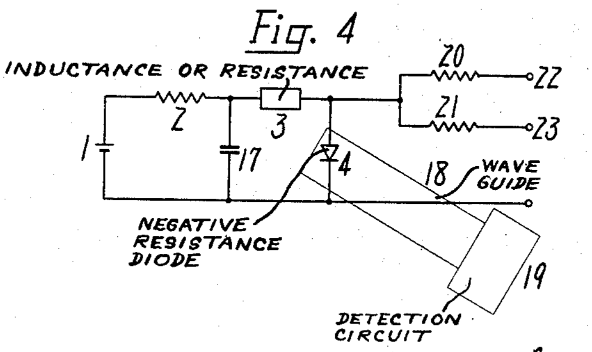
Figure 5:
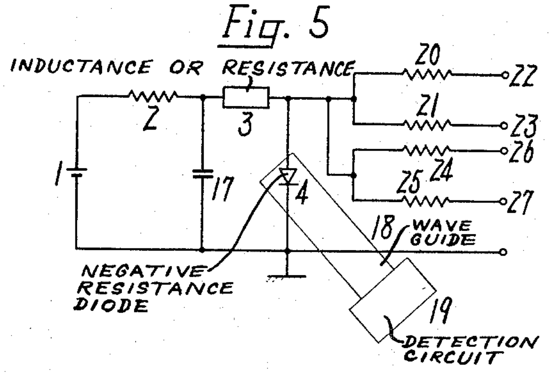
Figure 6:
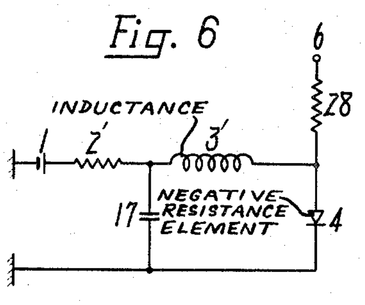
Figure 7:
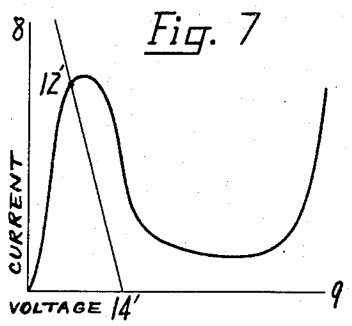
Figure 8:
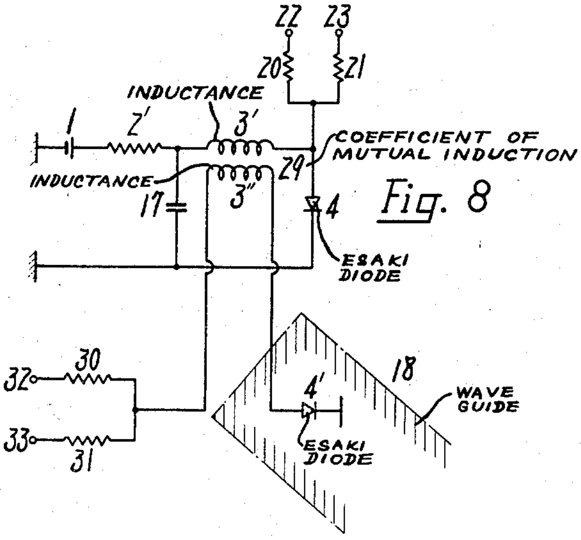
Figure 9:
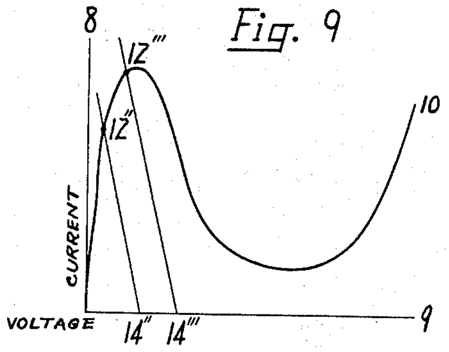
Figure 10:
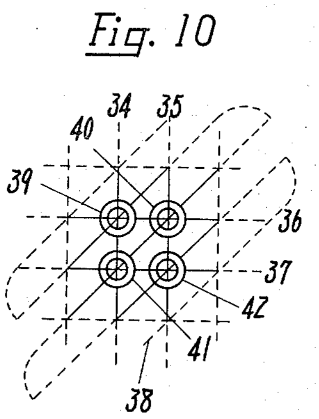
Figures 11, 12:
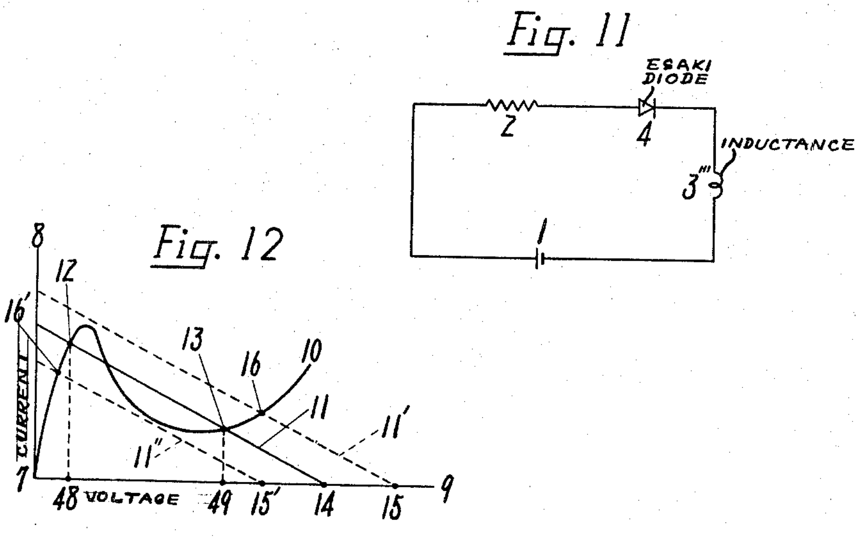
Figure 13:
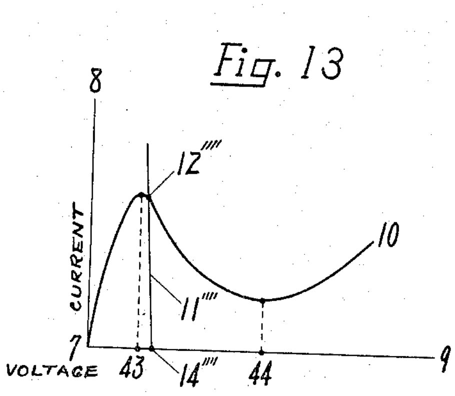
Figure 14:
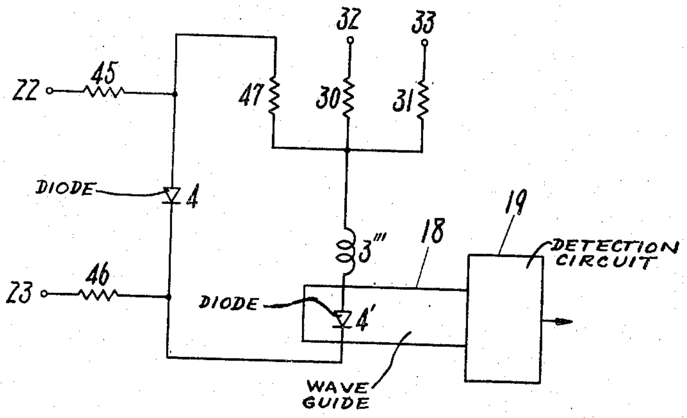

FIGS. 4 and 5, respectively, are diagrams in accordance with the present invention;

FIGS. 6 and 7 are a circuit diagram explaining a principle of the present invention, and a curve of a voltage-current characteristic;

FIGS. 8 and 9 are a diagram of another working embodiment of a memory unit and a curve explaining its operating state in accordance with the present invention;

FIG. 10 is a partial diagrammatic view of a memory unit of a magnetic core matrix used heretofore;

FIGS. 11 to 13 are diagrammatic views of a basic circuit and of curves of the characteristic of a memory unit by an element having a N type voltage-current characteristic; and FIG. 14 is a diagram of an application of the memory unit shown in FIGS. 11 to 13 in accordance with the present invention.

Figure 1:
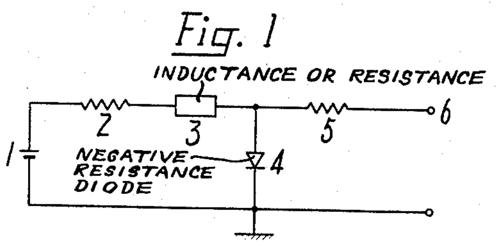
FIGURES 1 and 2 are diagrams of a basic circuit and of a curve of its characteristic of a memory unit by an element having a N type voltage-current characteristic according to the present invention.

Referring now to the drawings, and in particular to FIG. 1, the basic circuit of a memory unit of the present invention uses an element having a N type voltage-current characteristic as a negative resistance element, such as an Esaki diode (a tunnel diode), disposed in a circuit including in series a D.C. source 1, a resistance 2, an inductance or a resistance 3, a resistance 5 and an input terminal 6 for the pulse, while the diode 4 is disposed across between the inductance or resistance 3 and the resistance 5 and is grounded.

In the following description of the present invention, the use of the inductance 3 only will be described. However, in the case of using the resistance 2, the value of this resistance 2 is lower than that in the case of using the inductance 3, whereby the sum of both values are held always at a constant value.

Figure 2:
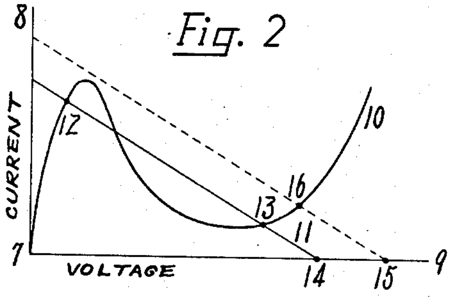

Referring now to FIG. 2, starting at the point 7, the electric current is expressed by the ordinate 8 and the voltage is expressed by the abscissa 9, then the voltage-current characteristic of the negative resistance diode 4 (FIG. 1), leads to a curve 10, as shown in FIG. 2. Accordingly, if the voltage of the power source 1 (FIG. 1) is taken at a value of 14, the resistance 2 is determined to show a gradient, such as 11, whereby 10 and 11 intersects each other at two points, namely at 12 and 13 (they also intersect at the part of the negative resistance, however, it is out of the question since this is unstable), then, the voltages and electric currents of the diode 4 take only the values at the intersecting points 12, 13, and consequently, a memory circuit of one bit in a binary scale can be formed by corresponding, for instance, to the state of the intersecting point 12 to 0 in a binary notation and the state of the intersecting point 13 to 1 in a binary notation.

Now, in the case of assuming the state of the circuit of FIG. 1 having the point 12 in FIG. 2, if the voltage at the value of 14 is increased to the point of 15, the state of the circuit is transferred to the point 16. The state of the circuit can be transferred again to the point 13 by returning the voltage to the value of 14. Also, when it is desired to obtain the state of the point 12 from the state of the point 13; it is of course to be easily effected by operating in the same manner as in the above by applying a reverse voltage change. That is to say, in the above manner, the writing and elimination of the memory content can be effected. In this case, actually as a limited pulse, a pulse of voltage of E volts over a time of $\tau$ is applied to the terminal 6, and the polarity of the pulse is determined corresponding to the direction to change the state, and the voltage is determined so as to pass over the valley of the curve 10, and the time $\tau$ is determined sufficient to effect these transfers.

Figure 3:
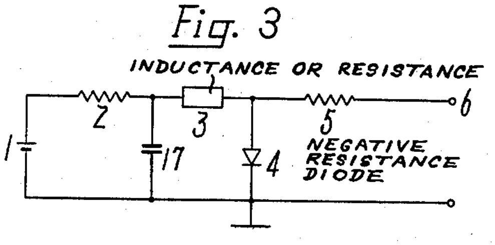
FIG. 3 is another circuit diagram in accordance with the present invention.

Referring now to FIG. 3, a view is disclosed for explaining one principle of the present invention, and FIG. 3, a condenser 17 is disposed across between the resistance 2 and the inductance or resistance 3 in addition to the circuit of FIG. 1 set as above described. Thus, an oscillation (a relaxation oscillation and the like) in this circuit can easily be caused by adjusting the values of mainly the inductance 3 and the condenser 17. That is, the circuit consisting of the inductance 3, the condenser 17 and the diode 4 has caused an oscillation by the action of the part of the negative resistance of the diode 4, and its oscillation energy is supplied from the direct current source 1 having the inner resistance 2 and also having the inner electromotive force. Accordingly, the inserted position of the inductance 3 in the circuit of FIG. 3 is not effected to change its functions, even when the inductance 3 is inserted into the circuit in series with the condenser 17. However, in the case of using a resistance in the position 3, the value of the resistance 2 in the circuit must take the value denoted by the slope 11, shown in FIG. 2. In the case of effecting the writing and the elimination by using the circuit of FIG. 3 adjusted about the inductance 3, the condenser 17 and the like as a memory circuit, the transient time is changed owing to the addition of capacity in comparison with that of the circuit of FIG. 1 as above described, and consequently, when the width of the control pulse is changed accordingly, its operation is effected definitely. That is to say, the circuit of FIG. 3 is now assumed to be in the state of the point 12, and in order to transfer it to the state of the point 13, when it is requested to be the voltage of E volts, the width of the time $\tau$, and the polarity of + pulse $P_1$ (from the point 13 to the point 12, — pulse is requested), if the pulse $P_2$ of the same voltage and polarity having a width of the time $\tau_2$ smaller than the time $\tau_1$, is applied to this circuit, then two-value-states, that is, the stable points, such as 12 and 13 and the like cannot be taken, and consequently, the circuit maintains the oscillation. However, when this circuit is in the state of the point 13, even when the pulse $P_2$ is applied thereto, the stable point is only moved once more toward the right along the curved line 10 and is again returned to the point 13, and accordingly, no oscillation is caused. Thus, in the circuit of FIG. 3, it has two states, namely, when the pulse reaches the state of the point 12, an oscillation is caused, and at the state of the point 13, no oscillation is caused. Accordingly, an information can be provided to the outside whether the oscillation is caused or not caused corresponding to the memory content when received a reading signal of the pulse $P_2$. Further, if the oscillation is detected effecting the reading, and the oscillation is to be stopped by applying again thereto a negative pulse from the terminal 6 by the above output, the state of the point 12 returns and consequently, the memory circuit assumes substantially the form of non-destructing of the content.

Referring now to FIG. 4, a working embodiment of the present invention is disclosed, which is provided with the resistances 20 and 21 in series with the inductance or resistance 3, as shown in FIG. 1, and address selection terminals 22 and 23 instead of a part of the resistance 5 and the terminal 6, as shown in FIG. 3, and in this embodiment for conducting an oscillation output upon the reading to a detection circuit 19 as an electromagnetic wave, a waveguide 18 is used. Further, if an antenna is used in this part of the waveguide 18, a signal may be conducted through this part to the detection circuit 19.

Now, under the voltage of E volts applied to the diode 4 by the control pulses $P_1$, $P_2$ as described in the explanation with regard to FIG. 3, a control is effected, but under the pulse below the above voltage, a control is not effected, and if a value of the voltage, not effecting the control, is assumed as E, then when pulses of the address selection in the circuit of FIG. 4 are applied to the terminals 22 and 23, as long as these two signals are superposed timely to each other, a pulse applied to the diode 4 reaches the voltage of E volts, so as to effect the control operation for making the pulse of the address selection signal. Also, in the case of feeding a pulse of the address selection signal to only either one of the terminals 22 and 23, a control operation is not effected owing to the lack of the pulse attaining a value of E volts applied to the diode 4. Thus, the designation for the address is effected definitely, and consequently, by the adoption of such construction, the circuit for generating the address selection signal can be considerably simplified. Further, by taking the values of $\tau_1$ and $\tau_2$ of the length of the time to be superposed on the pulses, respective writing, eliminating and reading are effected, and also the existence of the oscillation of course can be distinguished by a detecting circuit suitably coupled with the oscillation circuit.

Referring now to FIG. 5, a working embodiment is disclosed in the case of the production of control pulses $P_1$, $P_2$ separately by two sets of the circuit. In this case, the elements 24, 25, 26, 27 are of the same design as the elements 20, 21, 22, 23 in FIG. 4, to which the first mentioned elements are added, and exclusive of effecting separately the address selection, the functions and effects thereof are entirely the same as those in FIG. 4.

As obvious from the above description, the memory unit, in accordance with the present invention, is made to perform the operations of the memory and the reading by means of one negative resistance element. The writing, the eliminating and the reading are effected by two pulses of different width, and consequently, the address designation circuit is finished by one set, and also it can easily be effected substantially to provide a content non-destructing step upon the reading. Also, as the reading in the present invention is distinguished only by means of oscillation of the negative resistance element by the detection circuit, the signal reading can be effected stably and reliably even when the memory capacity is increased considerably. Further, for example, by the use of the Esaki diode (the tunnel diode), as shown in the working embodiment as the negative resistance element used in the circuit of the present invention, the operation thereof of course can be effected at a very large high speed. Accordingly, by the adoption of the present invention, the functions of an electronic computer can be raised considerably, and the effects upon the industry in the art are considered to provide a notable benefit.

Now, referring to FIGS. 6 to 9, which disclose another form of a memory unit of the present invention, the effect by unequality of a characteristic in the negative resistance element is entirely removed by forming a memory circuit, so as to select a circuit which is constant in such a manner, that the operating point of the negative resistance element is put at a monostable state.

FIGS. 6 and 7 are diagrams of a circuit showing a principle of one embodiment of the present invention and which has also a curve 10 of a voltage D-current I characteristic as shown in FIG. 2 and FIG. 6, respectively, shows a source of direct electric current 1, a resistance 2′, an inductance 3′, a capacity 17, a negative resistance element 4 (hereinafter called merely an element) and a resistance 28.

In FIG. 6, the circuit is selected at a monostable point 12′ (FIG. 7), and when the operating state of the element 4 is provided, if a positive pulse from the terminal 6 is impressed, the element 4 causes electric oscillation, and even after the impressed pulse is diminished, the oscillation still remains. However, when a negative pulse is impressed from the terminal 6, the oscillation is stopped, and the operating point of the element 4 is restored to the point 12′ in FIG. 7. Accordingly, if the operating state of the element 4 is set to have such monostable point responds to 0, 1 in binary notation and is made capable to read it, then, the yield rate of the element is made to be superior and the construction of the circuit can be made very easy in comparison with that of the prior element selected to obtain two stable points.

FIG. 8 shows one basic working embodiment of a memory unit having its circuit formed under a principle as above described, and FIG. 9 is an explanatory view for the operating state thereof. That is to say, in FIG. 8 are provided the resistances 2′, 20, 21, 30, 31, the inductances 3′, 3″, a co-efficient 29 of mutual induction between the inductances 3′ and 3″, a capacity 17, writing terminals 22 and 23 for memory contents, reading terminals 32 and 33, an Esaki diode 4 (a tunnel diode) for memorizing, and an Esaki diode 4′ for reading the memory content of the Esaki diode 4. Further, in the above description, the Esaki diodes 4, 4′ (hereinafter called diodes) are selected so that their circuit constants exist at a monostable point, respectively, as shown in FIG. 7. When the diode 4 has its operating state set at a monostable point, the memory content thereof corresponds to 0 in a binary notation, and when the electric oscillation is produced, the memory content thereof corresponds to 1 in the binary notation. Also, a sloped portion 18 shows a receiver, such as a waveguide for receiving an electromagnetic wave produced by the electric oscillation of the diode 4′.

In the above construction, in order to memorize to the diode 4 with 1 in a binary notation, positive pulses, by the check of the address, are impressed simultaneously from the writing terminals 22 and 23. Also, in order to memorize the diode 4 with 0 in binary notation, negative pulses are impressed simultaneously from both writing terminals 22 and 23. In this case, it is a course set that even when a positive pulse is impressed from either one of the writing terminals 22 and 23, the electric oscillation is not caused at the diode 4, and only when positive pulses are impressed simultaneously from both writing terminals 22 and 23, the electric oscillation is caused. Also, in the case of continuing the electric oscillations at the diode 4, the electric oscillations are stopped by the negative impressed pulses simultaneously from both writing terminals 22 and 23 and the operating point is restored to a monostable point. Further, it is of course set, that even when a negative pulse is impressed from only either one of writing terminals 22 and 23, the oscillation at the diode is not stopped.

It can be seen from the above description, that it can be set to accomplish that after 1 or 0 in a binary notation has been memorized at the diode 4, for reading the memory content, in the case a positive voltage is impressed from either one of the reading terminals 32 and 33, such as from 32, the operating point of the diode 4′ is put at a monostable point 12″ of FIG. 9, and also in the case of impressing positive voltages from both of the reading terminals 32 and 33, the operating point of the diode 4′ is put at the monostable point 12‴. That is, in this case, when the diode 4′ is on the point 12″ or on the point 12‴, respectively, the power source and voltage are made to be equalized with 14″ and 14‴. Now, when the diode 4 for memory is put in the state of electric oscillation, the oscillation voltage in the inductance 3″ is induced through the coefficient of mutual induction 29 of the inductances 3′, 3″, however, it is set that when the operating point of the reading diode 4′ by the oscillation voltage thereof is put on the point 12‴, electric oscillation is caused, but when the reading diode 4′ is put on the point 12″, electric oscillation is not caused.

Thus, when the diode 4 is put at the memory state corresponding to a signal 1 in binary notation, electric oscillations are caused, and consequently, by the check of the address, the reading, when positive voltages are impressed together from the reading terminals 32 and 33, the diode 4′ produces electric oscillations to generate electromagnetic waves. However, when the diode 4 is put on the memory state corresponding to a signal 0 in a binary notation, electric oscillation is not caused, and consequently, the diode 4′ is also at a non-electric oscillation state, and does not generate electromagnetic waves. That is, it shows that if electromagnetic waves are generated from the diode 4′, the memory content of the diode 4 is held at 1 and if electromagnetic waves are not generated, the memory content of the diode 4 is held at 0. Accordingly, if the existence of electromagnetic waves in the electric oscillation or non-electric oscillation state of the diode 4′ is ascertained by receiving through a waveguide or an antenna, then the memory content of the diode 4 can be read easily. Further, in this case, even when the voltages of the terminals 32 and 33 are removed, the memory content of the diode 4 is not changed, and consequently, it has an advantage not destructing the memory content thereof. Also, owing to the fact that the electric oscillation in the present invention utilizes the self-oscillation of the element, the frequency thereof can be used up to the maximum frequency of the element, and therefore, it has especially a very notable effect by applying it to a memory unit in a very large high speed electronic computer.

As above described, in the present invention, an effect of unequality of a characteristic of a negative resistance element is almost entirely removed by forming a memory circuit through the selection of a circuit constant so as to put the operating point of the negative resistance element at a monostable condition. Accordingly, in accordance with the present invention, the operation of a very large high speed is made to be stable and the manufacture of the memory unit is very easy and a merit in the field of the art at present is very great.

Referring now to FIG. 10, which discloses a part of the memory unit of the magnetic core matrix heretofore used, wherein the lines 34, 35, 36 and 37 are denoted for using of address designations. The line 38 stands for the reading of a memory content passing through the whole magnetic cores 39, 40, 41 and 42. In the above description, if the number of memory words is $n$ words, the reading line 38 passes through $n$ numbers of the magnetic cores. Accordingly, if the magnetic cores by which the addresses are designated generate a voltage (signal) of E volts and the magnetic cores by which the addresses are not designated generate a voltage (noise) of $e$ volts, when the reading is effected, since the reading line 38 has one magnetic core generating E volts and $(n-1)$ magnetic cores generating $e$ volts, if an output voltage of the reading line 38 is assumed as to be $E_s$ volts, then, $$E_s=E+(n-1)e$$

is obtained.

As apparent from the above formula, generally, when $n$ is made larger, the signal E is embedded within a range of the noise $(n-1)e$, then $E_s$ is made to be senseless, and consequently, in such a type, that is, in the case using the number $n$ of words having an effect to $S \cdot N$ ratio, not limiting to the unit, such as the magnetic core matrix, the increase of capacity was very difficult.

The present invention avoids these defects, and in a memory unit for storing information by the use of magnetic resistance elements, one or more negative resistance elements taking two states of oscillation or non-oscillation are provided in a reading circuit, whereby the output of the oscillation is detected to provide information to the outside.

Now, the detail of the form of the present invention will be explained by referring to FIGS. 11 to 14.

FIG. 11 shows an element having an N type voltage-current characteristic, for instance, a basic circuit of a memory unit using the Esaki diode (the tunnel diode). A resistance 2, a diode 4, an inductance 3‴ are in series in the circuit, which includes a D.C. source.

Referring now to FIG. 12, if 7 is taken as an original point, a voltage is represented by the abscissa 9 and an electric current is represented by the ordinate 8, then a voltage-current characteristic of the diode 4 takes the form of a curve as shown at 10. Accordingly, a voltage of the power source 1 shown in FIG. 11 has the value shown by 14. If the resistance 2 is selected as a resistance value of $R_1$ ohm showing a gradient, such as 11, so as to intersect the curve 10 and the line 11 at two points of 12 and 13, then voltage-current characteristic of the diode 4 cannot be taken other than the values of these two intersecting points 12, 13, and consequently, a memory circuit of one bit in a binary notation can be formed by corresponding the intersecting point 12 to 0 in a binary notation and the intersecting point 13 to 1 in a binary notation. That is to say, in the case of assuming the state of the circuit showing in FIG. 11 is put at the point 12 (state of 0) in FIG. 12, and when the value of the voltage at 14 is made to the value of 15 by changing $+\epsilon$ volts, the state of the intersecting point showing at 13 is changed into the state of 16, and consequently, the circuit of 0 in the memory content results in a memorization of 1. Contrary to the above description, if the circuit in FIG. 11 is put at the point of 13 (state of 1), then causing the value of 15′ to be transferred to the intersecting point of 16′ by changing the value of the voltage by $-\epsilon$, and by removing the voltage of $-\epsilon$ it can be returned to the state of 12. Further, 11′ and 11″ are characteristic curves plotted respectively by the resistance 2 ($R_1$) in the change of the voltage of $+\epsilon$ or $-\epsilon$, and either of both are parallel to 11. In FIG. 13, the voltage of the electric current source 1 in FIG. 11 is determined to be put at 14⁗ between the voltage 43 showing the maximum value of the electric current of the diode 4 and the voltage 44 showing the minimum value of electric current of the diode 4, and by selecting a value of the resistance 2, so as to have a gradient at 11⁗, two characteristic curves are intersected only at a point 12⁗, in a range showing a negative resistance by the characteristic curve 10 of the diode 1. In this case, there is no monostable point, as in FIG. 12, and as oscillations are caused by frequencies determined by the conditions of the circuit of the inductance 3''' or the constant of the diode 4 and the like, the circuit in FIG. 11 can be formed as an oscillation circuit.

Referring now to FIG. 14, a working embodiment of the present invention is disclosed, using a tunnel diode having an N type voltage-current characteristic as a negative resistance element. The construction, functions and effects of the embodiment shown in FIG. 14 will now be described in comparison with those shown in FIGS. 11 to 13.

FIG. 14 discloses writing address designation terminals 22 and 23, resistances 45 and 46 of $R_1/2$ ohm, the diode 4 for storing an information, the diode 4' for reading the information, reading address designation terminals 32 and 33, the resistance 47 for supplying the content of the diode 4 to the diode 4', resistances 30 and 31 for supplying address selection signals to the diode 4', a waveguide 18 and a receiving circuit 19. Among these elements, parts 22, 23, 45, 46 and 4 are adapted for writing and memorizing informations, the parts 3''', 30, 31, 32, 33, 47 and 4' take two states of oscillation or non-oscillation in response to the content of the memorized parts upon the reading, and the parts 18 and 19 are designed for providing information to the outside by detecting the oscillation.

In the above design, the voltage of the value shown by 14 in FIG. 12 is applied between the writing address designation terminals 22 and 23. The resistances 45 and 46 of $R_1/2$ ohm, and a tunnel diode 4 are provided and the parts of 22, 23, 45, 46 and 4 are put in the same states as those shown in FIG. 12 and two states of 1 or 0 are memorized to the diode 4. Accordingly, when the value of $\epsilon$ volts is made to $\epsilon/2$, the transfer of the state as above described is not caused. However, by selecting $\epsilon$ volts suitably if possible and also if the state of the diode 4 is at 0, only when the change of voltage is simultaneously given $+\epsilon/2$ volts to the terminal 22 and $-\epsilon/2$ volts to the terminal 23, the state is transferred to 1. If the state of 1 is held, only when the change of voltage is given simultaneously $-\epsilon/2$ to the terminal 22 and $+\epsilon/2$ volts to the terminal 23, the state is transferred to 0 so as to effect the address selection writing memory. Especially, in the present working embodiment, owing to the use of the tunnel diode, a time delay is almost removed by a tunnel effect of the diode. Consequently, the above operation for the change of state can be effected at a very large high speed.

On one hand, in the parts of 3''', 30, 31, 32, 33, 47 and 4, values of resistances 47, 30, 31 are to be $r_1$, $r_2$, $r_3$ ohm, and the voltage of $V_D$ volts from the diode 4 and the voltage of $V_M$, $V_N$ volts from the reading address designation terminals 32 and 33 are assumed to be applied to the diode 4' through the resistances of $r_1$, $r_2$, $r_3$. Now, if the inner impedances of the power scources of $V_D$, $V_M$, $V_N$, respectively, are very small in comparison with $r_1$, $r_2$, $r_3$ so as to be neglected then, a parallel combined resistance R of $r_1$, $r_2$, $r_3$ is as follows:

$$R=\frac{r_1r_2r_3}{r_1r_2+r_2r_3+r_3r_1}$$

Also, if an equivalent combined voltage of $V_D$, $V_M$, $V_N$ is selected as V volts, then $$V=\frac{1}{r_1r_2+r_2r_3+r_3r_1}(r_2r_3V_D+r_1r_3V_M+r_1r_2V_N)$$

is obtained.

In consideration of the above description, the circuit of this part shown in FIG. 14 is made as the equivalent circuit as that shown in FIG. 11. The diode 4' can be taken in either state of oscillation or non-oscillation corresponding to the memory content of the diode 4 by equalizing the value of this R to the gradient of 11''' shown in FIG. 13 and by changing the value of V with the voltage of the diode 4 and the voltage of the address designation.

That is to say, as above described, the voltage of the diode 4 is put in the state to have only either value of 1 or 0, and consequently, if the voltages of 48, 49 representing the voltages of the points of 12, 13 are put respectively as $v_D$, $v_1$, $$V_D=v_0 \text{ or } V_D=v_1$$

and $$v_0<v_1$$

Accordingly, if voltages applied to the reading address designation terminals 32, 33 upon the reading are put as $V_M$, then $$V_M=V_N=\xi \text{ volts}$$

is obtained. Now, by adjusting suitably the values of this $\xi$ and $r_1$, $r_2$, $r_3$, etc., the memory content of the diode 4 is to be 1, and when the address thereof is selected, that is, when $$V_D=v_1,\ V_M=V_N=\xi$$

are established, $V=$(the voltage of 14'''') is obtained, and this circuit is oscillated. However, when the memory content of the diode 4 is 0, or the address is not selected, that is, in the case of $$V_D=v_0, \text{ or } V_M=0, \text{ or } V_N=0$$

$V<$(the voltage of 43) is obtained, and is established that this circuit is not oscillated entirely. The operation of the reading as described herewith is effected without giving any defect for the content of the diode 4, and consequently, this memory circuit has a characteristic not destroyed upon the reading.

The parts of the waveguide 18 and the receiving circuit 19 radiate the output of oscillation which is obtained as above described as electromagnetic waves and form a circuit for reading the memory content by detecting the above electromagnetic waves. If the number of words to be memorized is $n$, $n$ number of the diode 4' may be coupled suitably with one guidewave 18. In this case, in the prior magnetic core matrix, it has a defect that a noise cannot be ascertained the discrimination thereof upon the increase of number of words to be memorized. However, in the present invention, when the parts designated by the address memorizes 1, a simple one part only oscillates and other does not entirely oscillate, and consequently, the increase of number of words to be memorized is adapted to use, a construction entirely no relation to the ratio of the noise and the signal. The memory unit according to the present invention of course can effect at a very large high speed the writing operation, and its content is not destroyed when the reading is effected, and also upon any increase of the memory capacity, the reading thereof can be effected easily and reliably. Thus, the functions of an electronic computer can be raised considerably and the applications in the field of this art achieve notable effects.

While we have disclosed several embodiments of the present inveniton, it is to be understood that these embodiments are given by example only and not in a limiting sense, the scope of the present invention being determined by the objects and the claims.

We claim:

1. A memory unit including a negative resistance element capable of forming bistable states corresponding to 0.1 of a binary code, comprising a negative resistance element, means for supplying pulses for read out and for write in, one of said pulses having an amplitude and time width sufficient to switch said negative resistance element from one of the bistable states to the other of the bistable states, another of said pulses having an amplitude and time width sufficient to cause oscillation, but insufficient to switch said negative resistance element from one of the bistable states to the other of the bistable states, a read out circuit, a waveguide in communication with said negative resistance element for detecting radiated oscillations when the memory content is put in condition 1 of a binary code.

2. A memory unit including a memorizing circuit comprising means for supplying a write in signal and a mountable circuit including a negative resistance element, the latter oscillating by the triggering action of a write in signal pulse having an amplitude sufficient to switch said negative resistance element into the negative resistance zone from the monostable point of said circuit by said write in signal means, the stable state and the oscillation state of said negative resistance element corresponding with 0 and 1 of a binary code, respectively, and a read out circuit comprising means for supplying a read out signal, a second monostable circuit including a second negative resistance element and caused to oscillate by said oscillation signal rendered from said memorizing circuit during said read out signal by means of said read out signal means, and information read out means combined with said second monostable circuit for detecting radiated oscillations.

3. A memory unit including a memorizing circuit comprising means for supplying a write in signal, and a bistable circuit including a negative resistance element, the stable states of said bistable circuit corresponding to 0 and 1 of a binary code, respectively, said write in signal switching from one of said stable states to the other of said stable states, said write in signal means supplying a reset pulse, and a read out circuit comprising means for supplying a memorized signal to said read out circuit, means for supplying a read out signal, a monostable circuit including another negative resistance element and causing switching the state of said monostable circuit to an unstable state by said read out signal from said read out signal means, said memorizing circuit providing the signal representing 1 of the binary code by said means for supplying a memorized signal and causing oscillation, and information read out means being combined with said monostable circuit for detecting radiated oscillations.

References Cited by the Examiner

UNITED STATES PATENTS

| | | | |
|---|---|---|---|
| 2,891,160 | 6/59 | Lebond | 307—88.5 |
| 2,986,724 | 5/61 | Jaeger | 307—88.5 |
| 3,017,613 | 1/62 | Miller | 307—88.5 |
| 3,034,106 | 5/62 | Grinich | 307—88.5 |

JOHN W. HUCKERT, *Primary Examiner.*

SAMUEL B. PRITCHARD, DAVID G. REDINBAUGH, ARTHUR GAUSS, *Examiners.*